United States Patent
Cisler et al.

(10) Patent No.: US 7,853,567 B2
(45) Date of Patent: Dec. 14, 2010

(54) CONFLICT RESOLUTION IN RECOVERY OF ELECTRONIC DATA

(75) Inventors: Pavel Cisler, Los Gatos, CA (US); Gene Zyrl Ragan, Santa Clara, CA (US); Dave Lyons, San Jose, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 11/499,885

(22) Filed: Aug. 4, 2006

(65) Prior Publication Data
US 2008/0059894 A1    Mar. 6, 2008

(51) Int. Cl.
*G06F 17/30*    (2006.01)
(52) U.S. Cl. ........................ 707/654; 715/229
(58) Field of Classification Search ................ 707/100, 707/654; 715/229
See application file for complete search history.

(56) References Cited

U.S. PATENT DOCUMENTS

| | | | |
|---|---|---|---|
| 5,150,473 A | 9/1992 | Zulch | |
| 5,163,148 A | 11/1992 | Walls | |
| 5,276,867 A | 1/1994 | Kenley et al. | |
| 5,680,562 A | 10/1997 | Conrad et al. | |
| 5,745,669 A | 4/1998 | Hugard et al. | |
| 5,758,359 A | 5/1998 | Saxon | |
| 5,790,120 A | 8/1998 | Lozares et al. | |
| 5,818,936 A | 10/1998 | Mashayekhi | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,023,506 A | 2/2000 | Ote et al. | |

(Continued)

FOREIGN PATENT DOCUMENTS

EP    0629950    12/1994

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner*—James Trujillo
*Assistant Examiner*—Amresh Singh
(74) *Attorney, Agent, or Firm*—Fish & Richardson P.C.

(57) ABSTRACT

Systems and methods are provided for resolving conflicts. In one implementation, a method relating to modifying a view in a user interface is provided. The method includes receiving, while a current view is displayed in a user interface, a first user input requesting that a history view associated with the current view be displayed. The history view is displayed in response to the first user input, the history view includes at least a first visual representation of an earlier version of the current view, and the earlier version includes a first element. There is received, while the history view is displayed, a second user input requesting that the current view be modified according to the earlier version, at least with regard to the first element. The method further includes determining, in response to the second user input, whether the current view includes a current version of the first element.

25 Claims, 7 Drawing Sheets

U.S. PATENT DOCUMENTS

| | | | |
|---|---|---|---|
| 6,097,313 | A | 8/2000 | Takahashi et al. |
| 6,112,318 | A | 8/2000 | Jouppi et al. |
| 6,167,532 | A | 12/2000 | Wisecup |
| 6,188,405 | B1 | 2/2001 | Czerwinski et al. |
| 6,366,988 | B1 | 4/2002 | Skiba et al. |
| 6,396,500 | B1 | 5/2002 | Qureshi et al. |
| 6,397,308 | B1 | 5/2002 | Ofek et al. |
| 6,424,626 | B1 | 7/2002 | Kidambi et al. |
| 6,460,055 | B1 | 10/2002 | Midgley et al. |
| 6,625,704 | B2 | 9/2003 | Winokur |
| 6,711,572 | B2 | 3/2004 | Zakharov et al. |
| 6,714,201 | B1 | 3/2004 | Grinstein et al. |
| 6,785,751 | B1 | 8/2004 | Connor |
| 6,785,786 | B1 | 8/2004 | Gold et al. |
| 6,857,001 | B2 | 2/2005 | Hitz et al. |
| 6,892,211 | B2 | 5/2005 | Hitz et al. |
| 6,901,493 | B1 | 5/2005 | Maffezzoni |
| 6,918,124 | B1 | 7/2005 | Novik et al. |
| 6,948,039 | B2 | 9/2005 | Biessener et al. |
| 6,959,368 | B1 | 10/2005 | St. Pierre et al. |
| 7,072,916 | B1 | 7/2006 | Lewis et al. |
| 7,103,740 | B1 | 9/2006 | Colgrove et al. |
| 7,111,136 | B2 | 9/2006 | Yamagami |
| 7,155,486 | B2 | 12/2006 | Aoshima et al. |
| 7,174,352 | B2 | 2/2007 | Kleiman et al. |
| 7,185,028 | B2 | 2/2007 | Lechner |
| 7,200,617 | B2 | 4/2007 | Kibuse |
| 7,222,194 | B2 | 5/2007 | Kano et al. |
| 7,318,134 | B1 | 1/2008 | Oliveira et al. |
| 7,418,619 | B1 | 8/2008 | Uhlmann et al. |
| 7,440,125 | B2 | 10/2008 | Maekawa et al. |
| 7,518,611 | B2 | 4/2009 | Boyd et al. |
| 7,630,021 | B2 | 12/2009 | Matsuzaka et al. |
| 7,669,141 | B1 | 2/2010 | Pegg |
| 7,676,689 | B1 | 3/2010 | Shioyama et al. |
| 2001/0047368 | A1 | 11/2001 | Oshinsky et al. |
| 2002/0023198 | A1 | 2/2002 | Kokubun et al. |
| 2002/0054158 | A1 | 5/2002 | Asami |
| 2002/0063737 | A1 | 5/2002 | Feig et al. |
| 2002/0160760 | A1 | 10/2002 | Aoyama |
| 2002/0174283 | A1 | 11/2002 | Lin |
| 2003/0063128 | A1 | 4/2003 | Salmimaa et al. |
| 2003/0126247 | A1 | 7/2003 | Strasser et al. |
| 2003/0131007 | A1* | 7/2003 | Schirmer et al. ............ 707/100 |
| 2003/0135650 | A1 | 7/2003 | Kano et al. |
| 2003/0137540 | A1 | 7/2003 | Klevenz et al. |
| 2003/0172937 | A1 | 9/2003 | Faries et al. |
| 2003/0220949 | A1 | 11/2003 | Witt et al. |
| 2004/0073560 | A1 | 4/2004 | Edwards |
| 2004/0078641 | A1 | 4/2004 | Fleischmann |
| 2004/0088331 | A1 | 5/2004 | Therrien et al. |
| 2004/0133575 | A1 | 7/2004 | Farmer et al. |
| 2004/0139396 | A1 | 7/2004 | Gelernter et al. |
| 2004/0167942 | A1 | 8/2004 | Oshinsky et al. |
| 2004/0193953 | A1 | 9/2004 | Callahan et al. |
| 2004/0210608 | A1 | 10/2004 | Lee et al. |
| 2004/0220980 | A1 | 11/2004 | Forster |
| 2004/0235523 | A1 | 11/2004 | Schrire et al. |
| 2004/0236769 | A1 | 11/2004 | Smith et al. |
| 2004/0236916 | A1 | 11/2004 | Berkowitz et al. |
| 2005/0071390 | A1 | 3/2005 | Midgley et al. |
| 2005/0091596 | A1 | 4/2005 | Anthony et al. |
| 2005/0102695 | A1 | 5/2005 | Musser |
| 2005/0144135 | A1 | 6/2005 | Juarez et al. |
| 2005/0149577 | A1 | 7/2005 | Okada et al. |
| 2005/0165867 | A1 | 7/2005 | Barton et al. |
| 2005/0187992 | A1 | 8/2005 | Prahlad et al. |
| 2005/0204186 | A1 | 9/2005 | Rothman et al. |
| 2005/0216527 | A1 | 9/2005 | Erlingsson |
| 2005/0246398 | A1 | 11/2005 | Barzilai et al. |
| 2005/0262168 | A1 | 11/2005 | Helliker et al. |
| 2005/0262377 | A1 | 11/2005 | Sim-Tang |
| 2006/0026218 | A1 | 2/2006 | Urmston |
| 2006/0053332 | A1 | 3/2006 | Uhlmann |
| 2006/0064444 | A1 | 3/2006 | Van Ingen et al. |
| 2006/0085792 | A1 | 4/2006 | Traut |
| 2006/0085817 | A1 | 4/2006 | Kim et al. |
| 2006/0101384 | A1* | 5/2006 | Sim-Tang et al. ........... 717/104 |
| 2006/0106893 | A1 | 5/2006 | Daniels et al. |
| 2006/0117309 | A1 | 6/2006 | Singhal et al. |
| 2006/0137010 | A1 | 6/2006 | Kramer et al. |
| 2006/0143250 | A1 | 6/2006 | Peterson et al. |
| 2006/0161861 | A1 | 7/2006 | Holecek et al. |
| 2006/0218363 | A1 | 9/2006 | Palapudi |
| 2006/0248294 | A1 | 11/2006 | Nedved et al. |
| 2007/0027935 | A1 | 2/2007 | Haselton et al. |
| 2007/0030528 | A1 | 2/2007 | Quaeler et al. |
| 2007/0078910 | A1 | 4/2007 | Bopardikar |
| 2007/0088702 | A1 | 4/2007 | Fridella et al. |
| 2007/0094312 | A1 | 4/2007 | Sim-Tang |
| 2007/0136389 | A1 | 6/2007 | Bergant et al. |
| 2007/0156772 | A1 | 7/2007 | Lechner |
| 2007/0168497 | A1 | 7/2007 | Locker et al. |
| 2007/0185922 | A1 | 8/2007 | Kapoor et al. |
| 2007/0192386 | A1 | 8/2007 | Fries et al. |
| 2007/0266007 | A1 | 11/2007 | Arrouye et al. |
| 2007/0271303 | A1 | 11/2007 | Menendez et al. |
| 2007/0288536 | A1 | 12/2007 | Sen et al. |
| 2008/0016576 | A1 | 1/2008 | Ueda et al. |
| 2008/0028007 | A1 | 1/2008 | Ishii et al. |
| 2008/0033922 | A1 | 2/2008 | Cisler et al. |
| 2008/0034004 | A1 | 2/2008 | Cisler et al. |
| 2008/0034011 | A1 | 2/2008 | Cisler et al. |
| 2008/0034013 | A1 | 2/2008 | Cisler et al. |
| 2008/0034017 | A1 | 2/2008 | Giampaolo et al. |
| 2008/0034018 | A1 | 2/2008 | Cisler et al. |
| 2008/0034019 | A1 | 2/2008 | Cisler et al. |
| 2008/0034039 | A1 | 2/2008 | Cisler et al. |
| 2008/0059894 | A1 | 3/2008 | Cisler et al. |
| 2008/0077808 | A1 | 3/2008 | Teicher et al. |
| 2008/0091655 | A1 | 4/2008 | Gokhale et al. |
| 2008/0126441 | A1 | 5/2008 | Cisler et al. |
| 2008/0126442 | A1 | 5/2008 | Cisler et al. |
| 2008/0141029 | A1 | 6/2008 | Culver |
| 2008/0177961 | A1 | 7/2008 | McSharry et al. |
| 2008/0229037 | A1 | 9/2008 | Bunte et al. |
| 2008/0285754 | A1 | 11/2008 | Kezmann |
| 2010/0017855 | A1 | 1/2010 | Johnson et al. |

FOREIGN PATENT DOCUMENTS

| | | |
|---|---|---|
| EP | 1152352 | 11/2001 |
| EP | 1582982 | 10/2005 |
| WO | 01/06356 | 1/2001 |
| WO | 02/101540 | 12/2002 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet:<URL:http://www.techerclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docx/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

Academic Resource Center, http://www.academicresourcecenter.net/curriculum/glossary.aspx.

International Search Report and Written Opinion, PCT/US2008/066212, Mar. 9, 2009, 26 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"StorageSync: Backup, Restore, & Synchronization Software User's Guide", SimpleTech, 2003, 100 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

Communication pursuant to Article 94(3) EPC for Application No. EP 07 799 899.5, dated Oct. 7, 2009, 4 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

* cited by examiner

CONFLICT RESOLUTION IN RECOVERY OF ELECTRONIC DATA

RELATED APPLICATIONS

This application is generally related to the following jointly owned and co-pending patent applications, each incorporated herein by reference in its entirety:

U.S. patent application Ser. No. 11/499,839, for "Managing Backup of Content," filed Aug. 4, 2006;

U.S. patent application Ser. No. 11/499,881, for "User Interface for Backup Management," filed Aug. 4, 2006;

U.S. patent application Ser. No. 11/499,879, for "Navigation of Electronic Backups," filed Aug. 4, 2006;

U.S. patent application Ser. No. 11/499,880, for "Architecture for Back Up and/or Recovery of Electronic Data," filed Aug. 4, 2006;

U.S. patent application Ser. No. 11/499,385, for "Searching a Backup Archive," filed Aug. 4, 2006;

U.S. patent application Ser. No. 11/499,250, for "Application-Based Backup-Restore of Electronic Information," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,256, for "Consistent Back Up of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user may have had second thoughts about the revisions, or may have come up with new ideas, and therefore open the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods are provided that relate to a conflict in restoring an interface view including processes and interfaces for resolving conflicts between an element to restore and a currently existing element. Specifically, when a user attempts to restore an element from a snapshot that has a current version as well, a conflict is generated. The user is alerted to the conflict and can choose, for example, to retain the current element, retain the snapshot element, or retain both elements.

In general, in one aspect, a method relating to modifying a view in a user interface is provided. The method includes receiving, while a current view is displayed in a user interface, a first user input requesting that a history view associated with the current view be displayed. The history view is displayed in response to the first user input, the history view includes at least a first visual representation of an earlier version of the current view, and the earlier version includes a first element. There is received, while the history view is displayed, a second user input requesting that the current view be modified according to the earlier version, at least with regard to the first element. The method further includes determining, in response to the second user input, whether the current view includes a current version of the first element.

Implementations of the method can include one or more of the following features. The determination can indicate that the current view does not include a current version of the first element, and the method can further include modifying, in response to the determination, the current view to include at least the first element. The determination can indicate that the current view does include a current version of the first element, and the method can further include displaying a conflict resolution view in response to the determination.

The conflict resolution view can provide user-selectable conflict resolution by at least one option of canceling the request that the current view be modified, replacing the current version of the first element with the first element included in the earlier version, and modifying the current view to include both the current version of the first element and the first element included in the earlier version. The user-selectable conflict resolution can provide the option of merging, in the current view, the current version of the first element and the first element included in the earlier version. The user-selectable conflict resolution can include a rollover effect graphically indicating a result of selecting each of the options. For the option of canceling the request that the current view be modified, the rollover effect can indicate that the current version of the first element will be kept. For the option of replacing the current version of the first element with the first element included in the earlier version, the rollover effect can indicate that the current version of the first element will be discarded. For the option of modifying the current view to include both the current version of the first element and the first element included in the earlier version, the rollover effect can indicate that both the current version of the first element and the first element included in the earlier version will be kept.

The conflict resolution view can contain the current version of the first element and the first element included in the earlier version. The first element can be one selected from the group including a folder, a file, an item, an information portion, a playlist, a directory, an image, system parameters, and combinations thereof.

In general, in one aspect, a computer program product is provided. The computer program product generates on a display device a graphical user interface. The graphical user interface includes a view display area for presenting a current view and a history view display area for presenting a history view associated with the current view. The history view includes at least a first visual representation of an earlier version of the current view and providing that a user can initiate a restoration of the current view with at least a portion of the earlier version. The graphical user interface also includes a conflict resolution function for alerting the user to a conflict in performing the restoration.

Implementations can include one or more of the following features. The conflict resolution function can include at least one option of an input control to cancel restoration, an input control to keep both conflicting elements, an input control to perform the restoration, and an input control to merge both conflicting elements. A rollover effect can be provided that graphically indicates a result of selecting any of the options. The first visual representation can be included in a timeline presented in the history view, the timeline can include several visual representations of earlier versions of the current view. The history view can further include an input control for modifying the timeline to include only at least one of the visual representations whose corresponding earlier version differs from the current view. The conflict resolution function can be included in a conflict resolution view that presents visual representations of respective elements in the current version and the earlier version that give rise to the conflict.

In general, in one aspect, a method is provided. The method includes defining a criterion for capturing a state of a view of a user interface. The state of the view is captured in accordance with the criterion. A prompt is received to suspend presentation of a current view and present a captured view. A determination is made as to if a conflict exists between the captured view and the current view. If a conflict does not exist, the captured view is reinstated into the current view of the user interface.

Implementations can include one or more of the following features. If a conflict is detected, the conflict can be resolved prior to reinstating the captured view. The conflict can be deemed to exist if the determination indicates that information present in the current view would be lost if the captured view were reinstated into the current view.

In general, in one aspect, a method is provided. A current view of a user interface is evaluated. A determination is made that an undesirable change to the current view of the user interface has occurred relative to a past view of the user interface. The current view of the user interface is suspended. One or more past view of the user interface are presented. A determination is made as to if a conflict exists between the captured view and the current view. If there is no conflict, a past view of the user interface is reinstated into the current view.

In general, in one aspect, a method is provided. The method includes presenting an element in a user interface, the element having a current state and being presented in a current view of a user interface. A state of the element is captured over time. A current view of the user interface including the element is suspended. A past view of the element is reinstated including resolving a conflict between the current view and past view with respect to the element.

Particular embodiments of the subject matter described in this specification can be implemented to realize one or more of the following advantages. A user can resolve conflicts when restoring data from a snapshot. Data that is present in a current state and in a snapshot can be restored without loss of data. The user can determine which version of the data to maintain as a current version.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
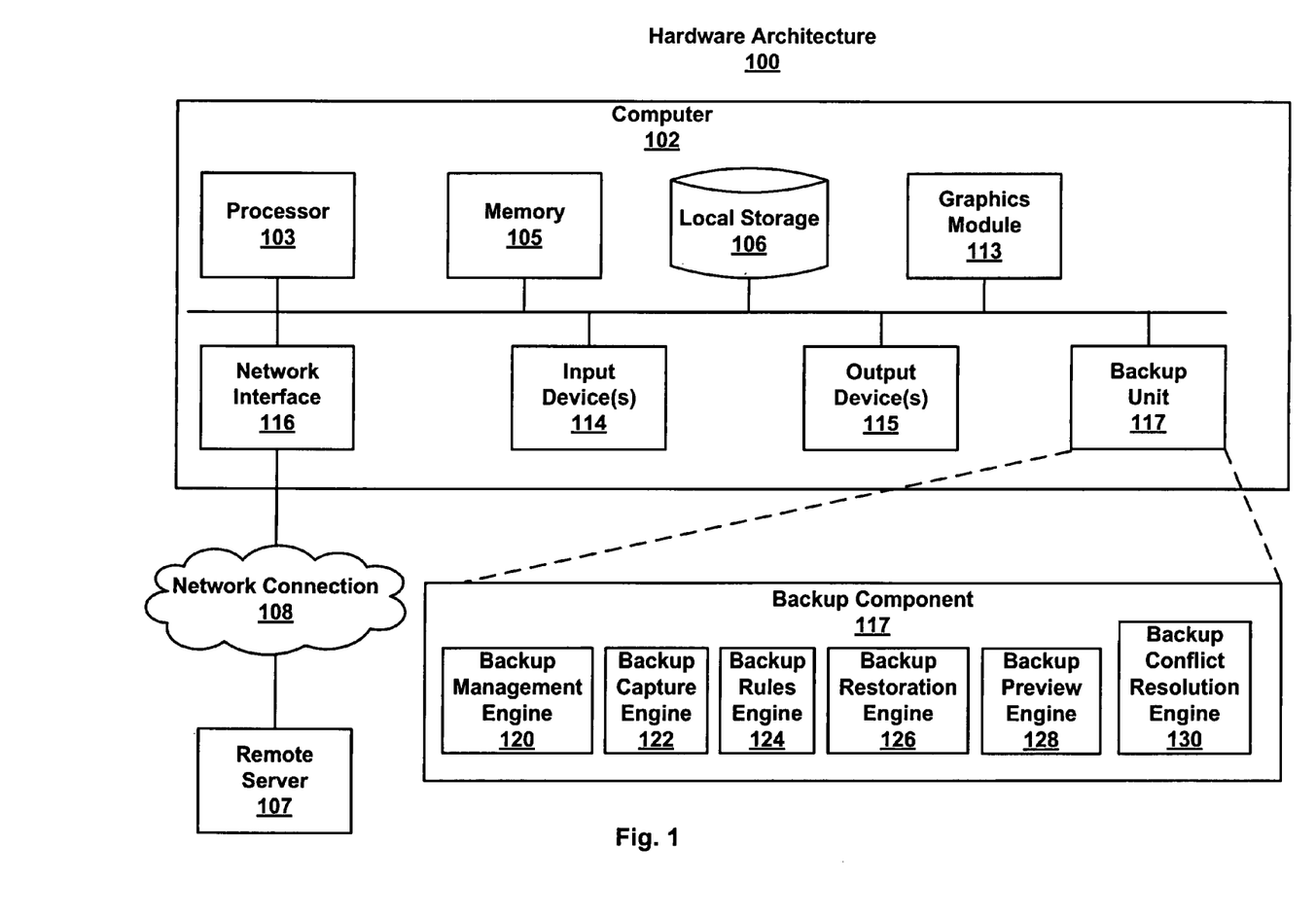
FIG. 1 is a block diagram of a hardware architecture for previewing, installing, managing and operating widgets in a display environment.

FIG. 1 is a block diagram of a hardware architecture 100 for modifying a user interface view. As used herein, a view refers to an item, element, or other content, capable of being stored and/or retrieved in an interface, that can be subjected to a back up operation by a backup component 117. For example, a user interface view can contain any number of icons, files, folders, application state information and/or machine state information, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

The computer 102 includes a backup component 117 that allows for the storage of versions of the computer's files to be saved, either within the local storage 106 or in an external storage repository (e.g., a backup repository). A backup management engine 120 coordinates the collection, storage, and retrieval of file versions performed by the backup component 117. A backup capture engine 122 locates changed files which are in need of a backup operation. The backup capture engine 122 then stores copies of these files in a targeted storage repository. The backup capture engine 122 can track multiple version copies of each file included in the backup repository.

A backup rules engine 124 contains settings for the details of capturing and storing the earlier versions. For example, the backup rules engine 124 may determine the frequency of the backup capture, the storage location for the backup versions, the types of files that are eligible for backup capture, and the events that trigger a backup capture (periodic or event-driven, etc.). A user can invoke a backup restoration engine 126 to restore previous versions of files that were captured by the backup capture engine 122. A backup preview engine 128 is configured to provide a preview of at least one of the captured earlier versions. A backup conflict resolution engine 130 may be configured to resolve a conflict that is presented for a particular restoration. For example, the backup conflict resolution engine 130 can detect that the restoration of a particular item to a previous version thereof would result in some portion of information being lost from the current version of the item. In some implementations, the conflict resolution engine 130 can detect this condition, alert the user about it, present one or more possible actions, and receive the user's selection of how to proceed, to name a few examples.

Systems and methods are provided for identifying and addressing conflicts in modifying a user interface view. The systems and methods can be stand alone, or otherwise integrated into a more comprehensive application. In the materials presented below, an integrated system and method for modifying a user interface view is disclosed. However, one of ordinary skill in the art will recognize that the engines, methods, processes and the like that are described can themselves be an individual process or application, part of an operating system, a plug-in or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.)

Figure 2:
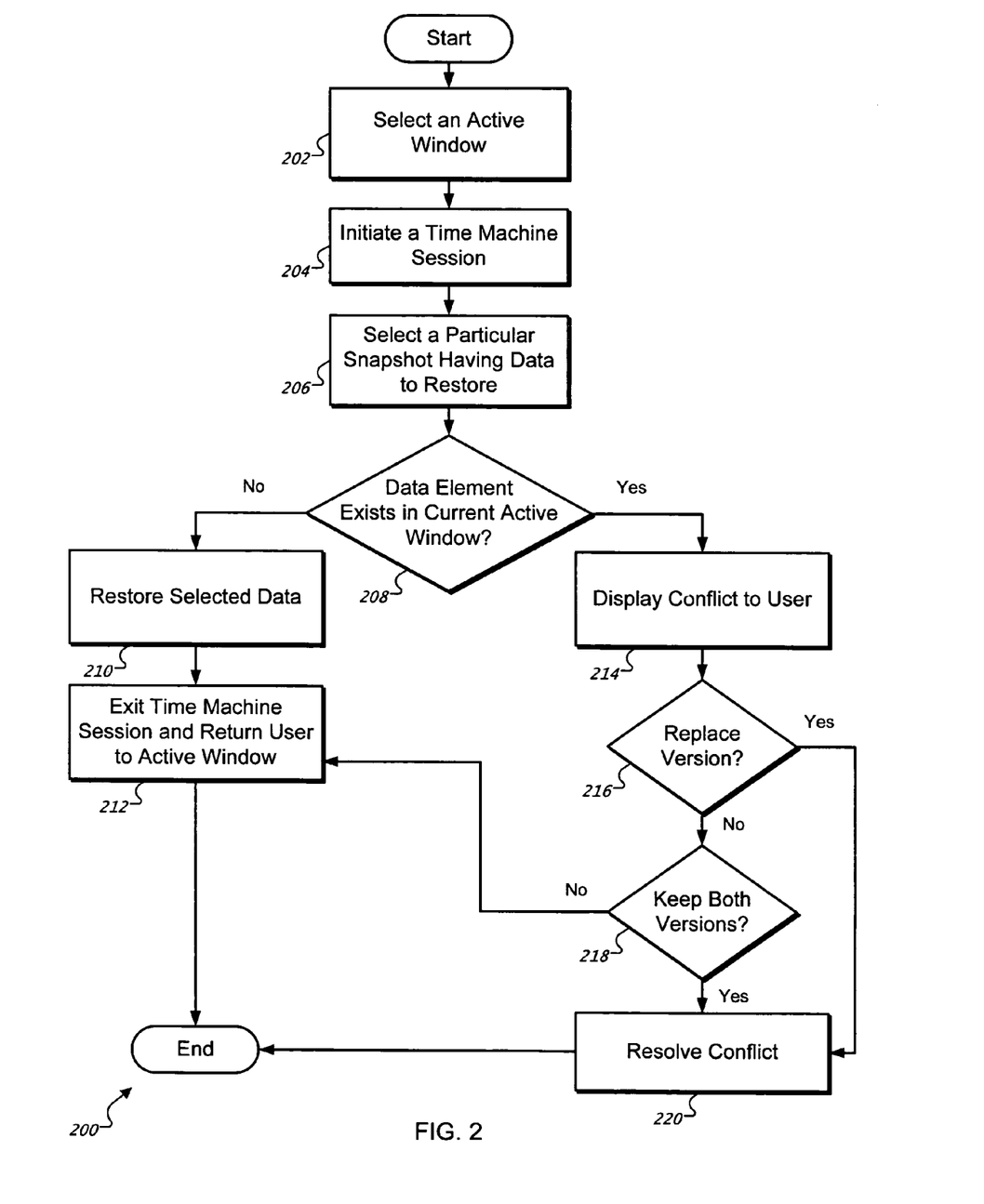
FIG. 2 is a flow diagram of a method illustrating a conflict scenario.

FIG. 2 is a flow diagram of a method 200 illustrating a conflict scenario. The method 200 can be performed in connection with presenting a user with a list of options in a "time machine" user interface that allows the user to selectively restore a currently displayed window, or part thereof, a state of an application or state of the system, preferences (e.g., user or system preferences), and the like to an earlier state that is presented by the time machine. Particularly, the method can resolve a conflict that arises when the user seeks to restore. For example, the user may restore all or part of any element that includes one or more folders, files, items, information portions, directories, images, system parameters, playlists, and the like. The time machine user interface may contain several snapshots in time displaying a visual representation of elements. In one implementation, a snapshot refers to a backup element stored in a historical archive that includes a backup of selected items or content as specified by the backup component 117. A conflict may occur when a user selects a particular snapshot for restoration that differs from a current version of an element. For example, a conflict can occur based on a version difference such as a difference in the file creation date, modified data content, or a file location change. In other words, a conflict may be deemed to exist when the restoration of the snapshot into the current view would cause information present in the current view to be lost. In contrast, if restoring the snapshot would merely add information to that already present in the current view, in any way, this may be deemed as not presenting a conflict.

The method 200 begins when a user selects 202 an active window in a user interface, and initiates 204 a time machine session for the selected window. For example, the user can initiate the backup management engine 120 to initiate the time machine session.

Initiating 204 a time machine session can, in one implementation, create a timeline display automatically within the time machine session. Alternatively, the time machine timeline can be displayed when a prompt is received from the user (e.g., a mouseover). The timeline display includes graphic descriptions of previous versions of the active window. In one implementation, the previous versions included in the timeline display may have been retrieved according to a schedule or according to a set of rules (e.g., events which trigger a snapshot). The criteria can be preexisting or can be user-defined. For example, snapshots can be taken simply as a function of time (e.g., hourly, daily, or some other time period). Additionally, in one implementation, the criteria for taking a snapshot can be programmatically defined or dynamically generated.

Alternatively, in one implementation, the snapshots can be taken when a triggering event occurs. For example, adding, deleting, or modifying an element may trigger the snapshot to be taken. However, some modifications may not be significant enough to trigger a snapshot. For example, changing the name of a file may not be a significant change and may be disregarded when creating a snapshot. In one implementation, a snapshot can be triggered, however, the snapshot is generated without all of the changed data according to some criteria. In another example, for a music database application such as iTunes, there are file changes indicating play counts for particular songs that may be unimportant to the actual content in the file, and therefore disregarded when creating a snapshot. In one implementation, the backup capture engine 122 captures the snapshot(s) at one or more times specified by the backup rules engine 124.

When an active window has been selected 202, and a time machine session has been initiated 204, the user may select 206 a particular snapshot having data to restore. In some implementations, the user may select a portion of the earlier version represented by the snapshot for restoration, as opposed to restoring the entire earlier version. Upon the selection, the method 200 verifies 208 whether or not at least one element to be restored exists in the current active window. In one implementation, this step is performed by the backup conflict resolution engine 130. If one or more elements to be restored do not exist in the current active window, the selected data is restored 210, the time machine session is exited, and the user is returned 212 to the active window. This provides, for example, that the user can employ the time machine to go back and restore one or more pieces of information that were part of the earlier version, but have since been removed or deleted.

If, in contrast, an element to be restored exists in the current active window, the conflict is displayed to the user 214. In one implementation, this step is performed by the backup conflict resolution engine 130. It will be understood that "exists" here includes also the scenario where a different, albeit recognizable, version of the element exists in the current version. The conflict is shown with an option to replace 216 a version of the element. If the user chooses to replace the current version of the element, the conflict is resolved 220. If the user chooses not to replace the current version, an option to keep 218 both versions is presented to the user. Keeping both versions may include providing the current window with both of them, or merging their contents into a new element, for example. If the user chooses to keep both versions, the conflict is resolved 220. In one implementation, the user-selected option is then performed by the backup restoration engine 126. Otherwise, the method cancels the restore operation, exits the time machine session, and returns 212 the user to the active window. In an alternative implementation, a set of rules can be applied to resolve the conflict.

A preview of the snapshot can be provided, for example so that the user can review the contents and decide whether to make the restoration. In some implementations, the preview is provided by the backup preview engine 128.

Accordingly, there may be performed a method or process that allows the user to restore a previously captured user interface state. Such a method may include defining a criterion for capturing a state of a view of a user interface, capturing the state of the view in accordance with the criterion, receiving a prompt to suspend presentation of a current view and present a captured view, determining if a conflict exists between the captured view and the current view, and if not, reinstating the captured view into the current view of the user interface.

As another example, a method may include evaluating a current view of a user interface, determining that an undesirable change to the current view of the user interface has occurred relative to a past view of the user interface, suspending the current view of the user interface, presenting one or more past views of the user interface, determining if a conflict exists between the captured view and the current view, and if not, reinstating a past view of the user interface into the current view.

In another example, a method includes presenting an element in a user interface, the element having a current state and being presented in a current view of a user interface, capturing over time, a state of the element, suspending a current view of the user interface including the element, reinstating a past view of the element including resolving a conflict between the current view and past view with respect to the element.

Figure 3:
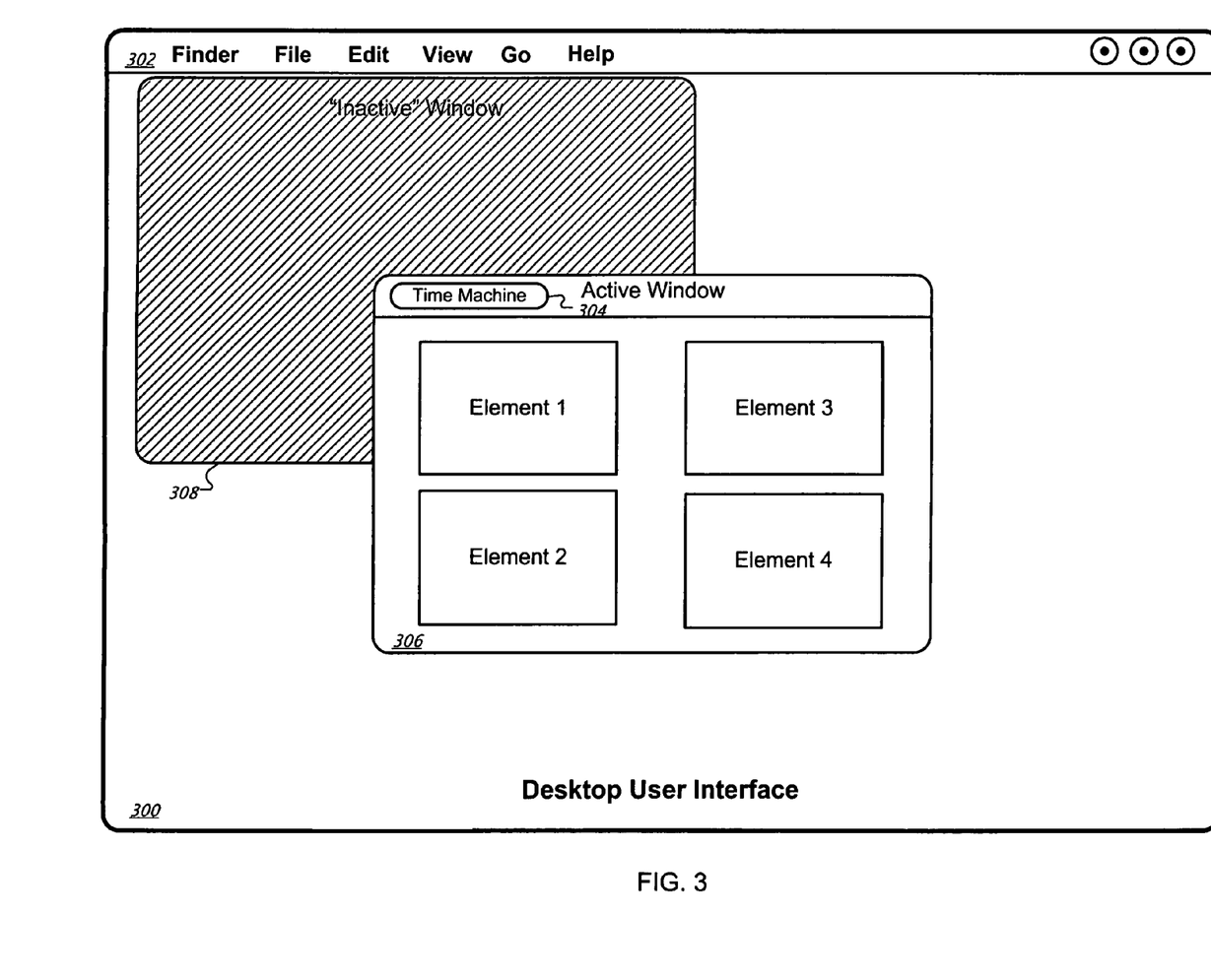
FIG. 3 is a screen shot depicting a desktop user interface prior to initiation of a time machine session.

FIG. 3 is a screen shot depicting one example of a user interface 300 (e.g., a desktop user interface) prior to initiation of a time machine session. The user interface 300 (also referred to herein as "desktop") is a user interface as may be provided by an operating system. The user interface 300 has a background, a menu bar 302 and may also include windows, icons, and other elements. The user interface 300 has a view display area that may depict a visual representation of elements associated with a currently selected view.

The user interface 300 may have multiple applications running, any or all of which can be presented in a separate window. In one implementation, the user activates a time machine session by for example, selecting a "Time Machine" icon 304 located in an active window 306. Other means for activating the time machine are possible. For simplicity, one active window 306 and one inactive window 308 are shown. The active window 306 may contain various types of elements. For example, elements 1-4 shown in the active window 306 may include folders, files, information, playlists, or data of various types. In some implementations, the active window may be scaled upon entering the time machine to fit within the presentation interface. For example, if an application is running in full screen mode (e.g., iTunes) when the time machine session is initiated, the application window may be scaled down to fit within the time machine interface.

Figure 4:
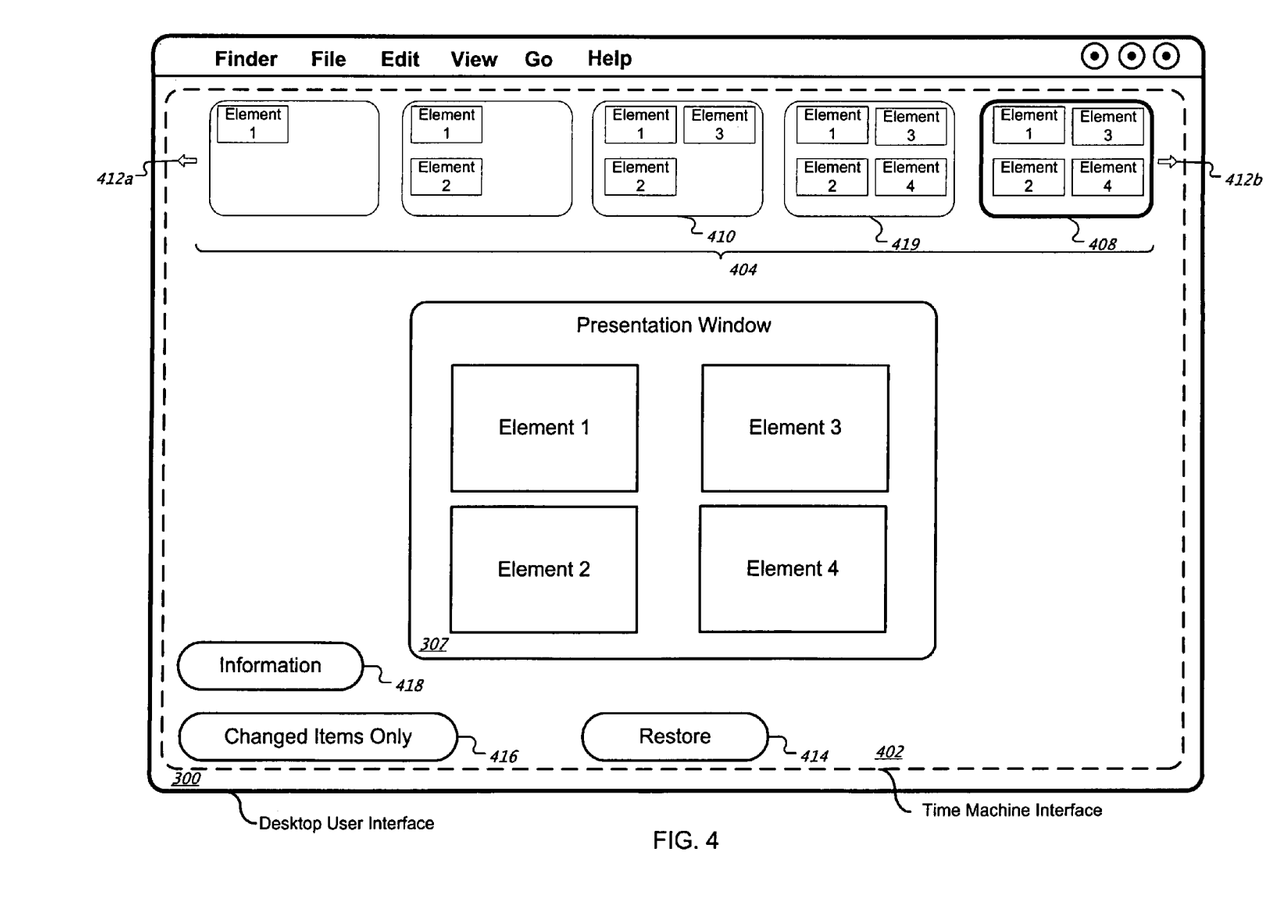
FIG. 4 is a screen shot depicting an initial state for a time machine user interface.

FIG. 4 is a screen shot for one implementation depicting an initial state for a time machine user interface 402 after the Time Machine icon 304 has been selected. The time machine interface 402 includes a presentation window 307, a timeline 404, and function buttons. The timeline 404 presents a history view associated with the current view. The time machine interface 402 is shown in FIG. 4 as a layer differentiated from the desktop by a dashed line around the perimeter of the user interface. In one implementation, the user interface 300 and associated active window 306 is obscured or otherwise hidden while the time machine is active.

The presentation window 307 may show the currently selected snapshot, or a portion thereof. Alternatively, the presentation window 307 may show a selected one of several available snapshots. In one example, a user may operate the time machine interface so as to sequentially select each snapshot and may restore elements from these selected snapshots until the current version engulfs the entire history of the timeline 404, or some portion thereof. For example, the user may select a snapshot in the timeline 404 and merge its contents with the current active window contents by restoring each element individually, and keeping both versions in some cases, to achieve a merged list of elements. Additional display options for the presentation window 307 will be discussed in detail in FIG. 7 of this description.

The timeline 404 may include a number of snapshots representing slices of time for active window elements. Each snapshot provides a screenshot representation of an earlier version of the active window 306 at a particular point in time. The snapshots can represent periodic backup points in time or can represent snapshots of the active window where a change has occurred. FIG. 4 shows a scenario where the snapshots represent changes over time.

In some implementations the timeline 404 includes a visual representation of elements, and can appear across the top portion of the time machine interface 402 (as shown). Alternatively, the timeline may not appear in the top portion of the time machine interface 402 until a user moves their cursor (or otherwise activates) to the top portion of the interface.

In alternative implementations, all snapshots may be shown according to when they are taken regardless of changes between snapshots. In another alternative implementation, the snapshot may indicate a range of time covered by a single snapshot where no changes have occurred (e.g., Jun. 1-Aug. 8, 2005). In another implementation, the rate of snapshots can vary over time. For example, there may be a number of snapshots in the newest archives, but the snapshots become more spaced in time as they reach further into the past. For example, hourly snapshots for the current day may turn into daily snapshots, which turn into weekly snapshots that become monthly snapshots as their file dates reach further into the past. The transition to later snapshots can be achieved in one implementation, by selecting a representative snapshot from a group of snapshots and deleting the rest.

As shown in FIG. 4, the most recent snapshot 408 is shown with a highlighted border. This represents the present state of the contents of the presentation window 307. The other snapshots shown in the timeline 404 represent states of the active window 306 in the past from which there have been changes to the content of the active window 306. For example, the snapshot 410 shows a snapshot of the window which includes three elements instead of four elements. Between the prior snapshot 410, and the current snapshot 408, element 4 has been added.

The other snapshots in the timeline 404 show other configurations of past states of the active window 306. For example, different numbers of elements show additions and deletions have occurred over time. The time machine interface 402 may also show modifications that have been made between different versions of folders, files, or items, and the like.

Arrow buttons 412a and 412b shown to the left and right of the snapshots allow the user to navigate additional snapshots not shown, thus there can be a large number of snapshots to select from.

The time machine interface 402 includes a restore button 414, a changed items only button 416, and an information button 418. Other buttons are possible. The restore button 414, when selected, restores the window to the selected state represented by the selected snapshot presented in the presentation window 306 and exits the time machine 402 (e.g. restoring the user interface 300). A user may select a snapshot and then select the restore button 414 to modify the current version of the element selected. The changed items only button 416 filters the snapshots to show only those that differ from the current state. That is, the changed items only button 416 does not refer to the incremental changes between snapshots in the timeline 404, rather, it refers to omitting those snapshots whose states are identical to the current state of the active window 306. For example, if the most recent snapshot 408 is identical to a snapshot 410 that occurs earlier in time, selecting the changed items only button 416 will cause the time machine to cease displaying one of the copies, e.g., remove snapshot 410 from the timeline. This may help the user locate a previous version from which to restore contents different than those in the current version.

The information button 418 provides information regarding the selected snapshot. In one implementation, selecting the information button 418 opens a panel display. The panel display provides, in one implementation, information including: the date and time the snapshot was made; the location of actual elements of a snapshot; the size of the snapshot; and a comment section.

Figure 5:
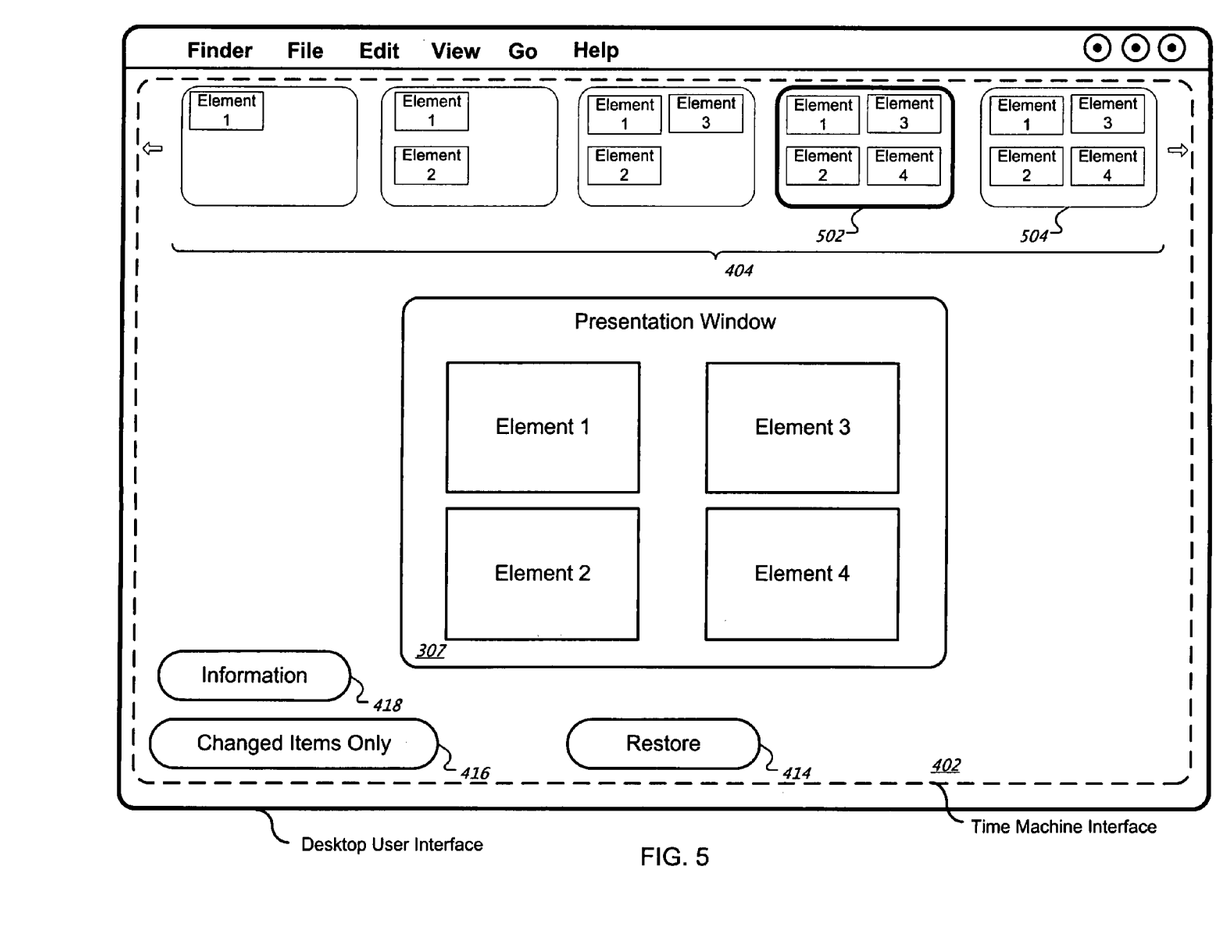
FIG. 5 is a screen shot depicting a time machine user interface where a user has selected a particular snapshot.

While the previous example involved changes that were visualized through the presence or absence of elements in the window, the following example involves also differences at a deeper level. FIG. 5 is a screen shot depicting a time machine user interface where a user has selected a particular snapshot 502. While both a current version 504 and the snapshot version 502 of the window include element 4, the element 4 in the snapshot 502 is a prior version of element 4 in the current version 504. Upon the selection, the presentation window 307 changes to reflect the contents of the selected snapshot 502. For example, if snapshot 502 has versions of a word processing file from last week, the user may wish to go back to this version if an error occurs in the current version of the file. The user may choose an appropriate version and then select the restore button 414 to return to the older file. However, since a version of the file exists in the current document, a conflict will arise.

Figure 6:
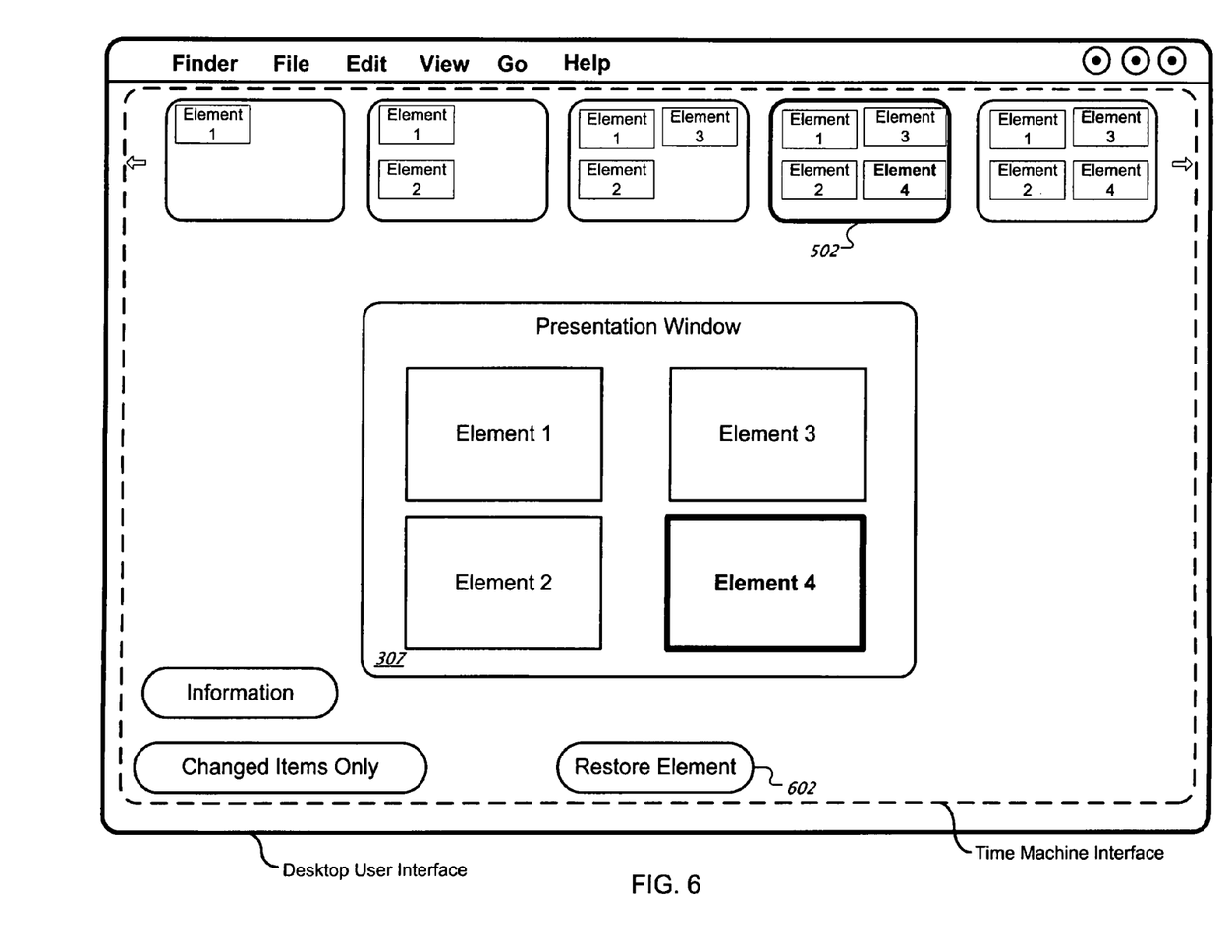
FIG. 6 is a screen shot depicting a time machine user interface after a snapshot has been selected for restore.

FIG. 6 is a screen shot depicting a time machine user interface after the snapshot 502 has been selected for restore. The presentation window 307 changes to reflect the newly selected snapshot. For example, if element 4 is a file that has been corrupted in the current version, the user could select the restore button 414 (shown in FIG. 5) and retrieve an earlier version of element 4. However, restoring the entire window restores everything in the current version with an earlier version of each element, thereby overwriting potentially useful information. In some implementations, the time machine user interface allows the user to analyze changed content before a restore is performed. For example, the restore button 414 (shown in FIG. 5) may change to a restore element button 602 after the snapshot 502 has been selected. The restore element button 602 may restore a selected element and leave the rest of the file structure intact. In this example, when the restore button 414 is selected, a conflict is generated because the current version of the active window 306 already includes all elements in the snapshot version 502. Therefore, a conflict management screen will be provided to resolve the conflict.

Figure 7:
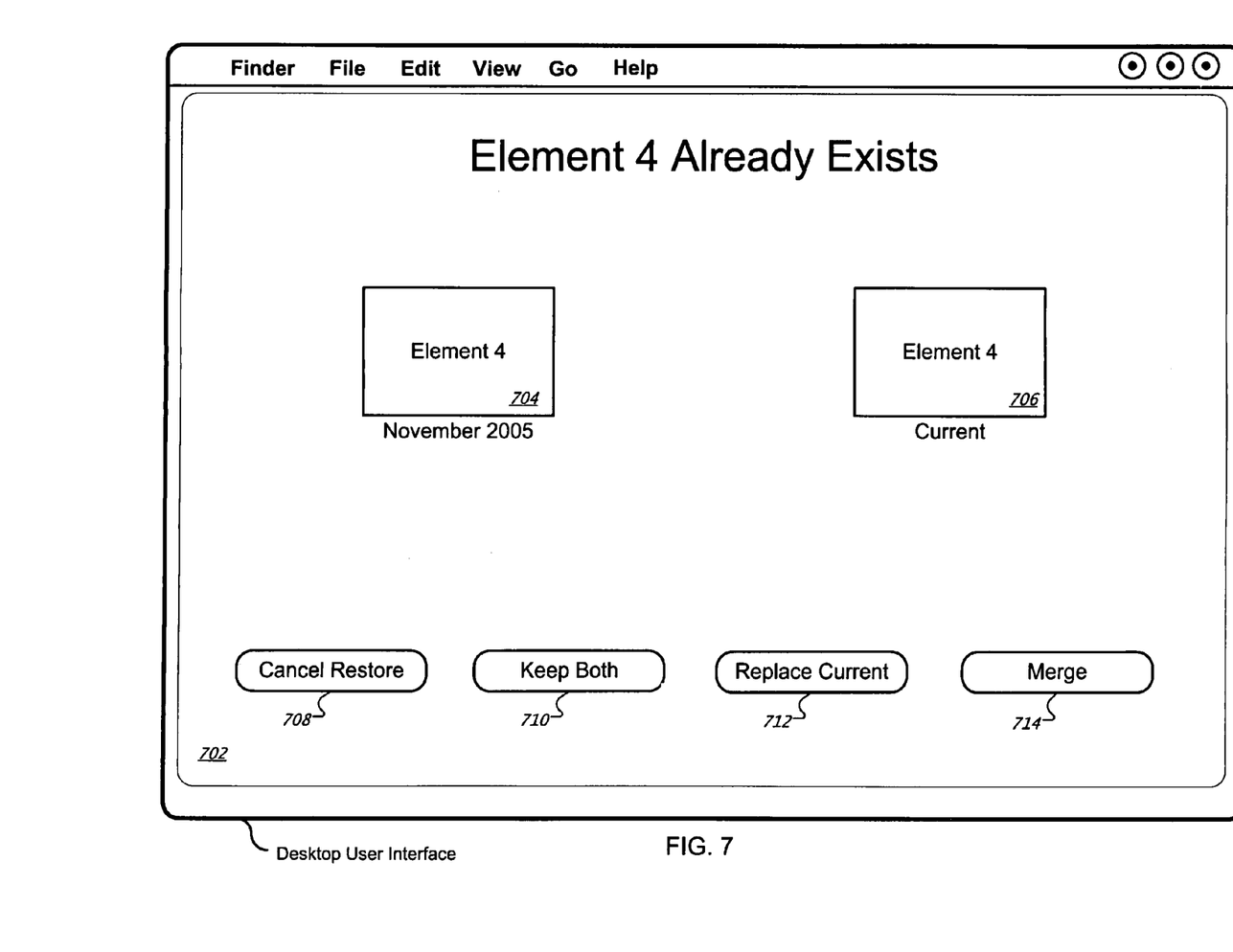
FIG. 7 is a screen shot depicting a conflict management screen.

FIG. 7 is a screen shot depicting a conflict management screen 702. In one implementation, the screen 702 is generated by the backup conflict resolution engine 130. The conflict management screen 702 may be provided when the user attempts to restore an already existing element. The conflict management screen 702 notifies the user that the element already exists and can also present representations of the conflicting elements including the date of the snapshot element. For example, if a conflict arises, the conflict management screen 702 can graphically display the differences between the elements that are conflicting, such as element 4 (704) that was modified in November 2005 and element 4 (706) that is an updated version of the same element. When the user is notified about a conflict, one or more options may be presented: cancel restore 708, keep both 710, replace current 712, and merge 714. The cancel restore button 708 cancels an element restore and returns the user to the time machine interface 402 (FIG. 4). This means that no change is made in the current version. The keep both button 710 allows the user to keep both elements, for example, by renaming the snapshot version of element 4. After selection of the keep both button, the time machine can exit back to the time machine interface 402, but with both the restored earlier version of element 4 (renamed) and the current element 4. The replace current button 712 allows a user to replace the current version of an element with a previous version. For example, if information was unintentionally deleted from a document, the replace current version button 712 can be used to restore the data using a previously saved version of the document. The time machine can exit and returns to the time machine interface 402, however, the element 4 shown is the restored version.

In some implementations, the merge button 714 may be used to combine multiple snapshots to create the current version. In one implementation, the elements may be folders where it is possible to merge the contents of the folders into a single folder. For example, if a current folder has files A, B, and C, and the earlier snapshot includes files B, C, D, and E, then the merge would only restore the files of the snapshot that were not present in the current version. The merge option allows for creating the most current version of a file or folder using multiple previous versions. In this example, the merge button 714 may be selected and the folder would include the current A, B, and C files plus the snapshot D and E files.

In some implementations, when the user moves the cursor over one of the option buttons, a rollover effect can be generated which graphically indicates the result of a selection of that button. For example, if the user moves the cursor over the replace current button 712, the graphics above can change to show the replacement effect. For example, a red "X" may appear over the current element 4 (706) to indicate the element will be discarded when the conflict is resolved. Similarly, a green checkmark may appear in the snapshot element 4 (704) to indicate what will occur when the conflict is resolved. For example, if the restore is cancelled, the rollover effect may use a green checkmark to indicate that the current version of the element will be kept. In some implementations, the rollover effect may graphically show a merge by visually displaying the combination of a current version of an element and an earlier version of the same element to indicate both files will be kept. In some implementations, an arrow can be shown pointing from the snapshot 704 to the current version 706 to indicate that snapshot 704 is replacing the current version 706.

In one implementation, when a conflict is identified, a user can select a particular rule from a set of rules to use in resolving the conflict. In another implementation, an identified conflict can be automatically resolved according to one or more rules without user interaction. The rules can be user selected and/or ordered, programmatically defined, or otherwise generated. For example, the rules can state that a conflict is always resolved in favor of the newer version of an element.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments may be used, and that the present examples can be implemented using graphics tools and products other than those described above. In particular, the client/server approach is merely one example of an architecture for providing the functionality described herein; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description. In addition, the present examples are not described with reference to any particular programming language. It will be appreciated that a variety of programming languages may be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method relating to modifying a view in a user interface, the method comprising:
   receiving, while a current view of an active window is displayed in a user interface, a first user input requesting that a history view associated with the current view of the active window be displayed;
   displaying the history view in a presentation window distinct from the active window in response to the first user input, the history view including at least a first representation of the active window, where the first representation shows a past state of the current view of the active window and includes visual representations of elements from the past state, including a visual representation of a first element, where the underlying data for the first representation is stored in an archive;
   receiving, while the history view is displayed, a second user input requesting that the current view of the active window be modified according to the first representation, at least with regard to the first element;
   determining, in response to the second user input, that the current view of the active window includes a current version of the first element; and
   presenting one or more user-selectable options to resolve a conflict in response to the determination.

2. The method of claim 1, further comprising displaying a conflict resolution view in response to the determination.

3. The method of claim 2, wherein the conflict resolution view contains the current version of the first element and the first element included in the first representation.

4. The method of claim 1, wherein the one or more user-selectable options include at least one option of:
   canceling the request that the current view be modified;
   replacing the current version of the first element with the first element included in the earlier version; and
   modifying the current view to include both the current version of the first element and the first element included in the first representation.

5. The method of claim 4, wherein the user-selectable conflict resolution provides the option of merging, in the current view, the current version of the first element and the first element included in the first representation.

6. The method of claim 4, wherein the user-selectable conflict resolution includes a rollover effect graphically indicating a result of selecting each of the options.

7. The method of claim 6, wherein, for the option of canceling the request that the current view be modified, the rollover effect indicates that the current version of the first element will be kept.

8. The method of claim 6, wherein, for the option of replacing the current version of the first element with the first element included in the first representation, the rollover effect indicates that the current version of the first element will be discarded.

9. The method of claim 4, wherein, for the option of modifying the current view to include both the current version of the first element and the first element included in the first representation, the rollover effect indicates that both the current version of the first element and the first element included in the first representation will be kept.

10. The method of claim 1, wherein the first element is one selected from the group consisting of: a folder, a file, an item, an information portion, a playlist, a directory, an image, system parameters, and combinations thereof.

11. A machine-readable storage device or a machine-readable storage substrate having stored thereon instructions which, when executed by a processor, cause the processor to perform operations comprising:
   receiving, while a current view of an active window is displayed in a user interface, a first user input requesting that a history view associated with the current view of the active window be displayed;
   displaying the history view in a presentation window distinct from the active window in response to the first user input, the history view including at least a first representation of the active window, where the first representation shows a past state of the current view of the active window and includes visual representations of elements from the past state, including a visual representation of a first element, where the underlying data for the first representation is stored in an archive;
   receiving, while the history view is displayed, a second user input requesting that the current view of the active window be modified according to the first representation, at least with regard to the first element;
   determining, in response to the second user input, whether the current view of the active window includes a current version of the first element; and
   presenting one or more user-selectable options to resolve a conflict in response to the determination if the determination indicates that the current view of the active window does not include a current version of the first element, and otherwise modifying the current view of the active window to include at least the first element in response to the determination.

12. A computer program product tangibly embodied in a machine-readable storage device or a machine-readable storage substrate, the computer program product including instructions that, when executed, generate on a display device a graphical user interface comprising:
   a view display area for presenting a current view of an active window;
   a history view display area for presenting a presentation window distinct from the active window, the presentation window including a history view associated with the current view of the active window, the history view including at least a first representation of the active window, where the first representation shows a past state of the current view of the active window and includes visual representations of elements from the past state, the history view providing that a user can initiate a restoration of the current view with at least a portion of the earlier version; and
   a conflict resolution function for alerting the user to a conflict in performing the restoration and presenting one or more user-selectable options to resolve the conflict.

13. The computer program product of claim 12, wherein the one or more user-selectable options include at least one option of:
   an input control to cancel restoration;
   an input control to keep both conflicting elements;
   an input control to perform the restoration; and
   an input control to merge both conflicting elements.

14. The computer program product of claim 13, wherein a rollover effect is provided that graphically indicates a result of selecting any of the options.

15. The computer program product of claim 12, wherein the first representation is included in a timeline presented in the history view, the timeline including several representations of earlier versions of the current view.

16. The computer program product of claim 15, wherein the history view further includes an input control for modifying the timeline to include only at least one of the representations whose corresponding earlier version differs from the current view.

17. The computer program product of claim 12, wherein the conflict resolution function is included in a conflict resolution view that presents visual representations of respective elements in the current version and the earlier version that give rise to the conflict.

18. A method comprising:
   defining a criterion for capturing a state of a view of a user interface;
   capturing the state of the view in accordance with the criterion, and storing the captured state in an archive;
   receiving a prompt to suspend presentation of a current view of the user interface and to present a representation of a captured view of the user interface in a presentation window distinct from the user interface, where the representation of the captured view shows the captured state of the view;
   determining that a conflict exists between the representation of the captured view and the current view; and
   reinstating the representation of the captured view into the current view of the user interface, including resolving the conflict prior to reinstating the representation of the captured view, where resolving the conflict includes providing one or more user-selectable options to resolve the conflict and receiving input selecting one of the options.

19. The method of claim 18, wherein the conflict is deemed to exist if the determination indicates that information present in the current view would be lost if the captured view were reinstated into the current view.

20. The method of claim 18, wherein the criterion includes capturing a state of a view of the user interface when any element is added to or deleted from the user interface.

21. A machine-readable storage device or a machine-readable storage substrate having stored thereon instructions which, when executed by a processor, cause the processor to perform operations comprising:
   defining a criterion for capturing a state of a view of a user interface;
   capturing the state of the view in accordance with the criterion, and storing the captured state in an archive;
   receiving a prompt to suspend presentation of a current view of the user interface and to present a captured view of the user interface in a presentation window distinct from the user interface, where the representation of the captured view shows the captured state of the view;
   determining if a conflict exists between the representation of the captured view and the current view; and
   reinstating the representation of the captured view into the current view of the user interface, including, when a conflict exists between the representation of the captured view and the current view, resolving the conflict prior to reinstating the representation of the captured view, where resolving the conflict includes providing one or more user-selectable options to resolve the conflict and receiving input selecting one of the options.

22. A method comprising:
   evaluating a current view of a user interface;
   determining that an undesirable change to the current view of the user interface has occurred relative to a past view of the user interface;
   suspending the current view of the user interface;
   presenting one or more representations of past views of the user interface in a presentation window distinct from the user interface, where each representation shows a past state of the current view of the user interface and includes visual representations of elements from the past state, and where the underlying data for each representation is stored in an archive;
   receiving input requesting that the current view be modified according to a first representation in the one or more representations;
   determining that a conflict exists between the first representation and the current view; and
   reinstating the first representation into the current view, including resolving the conflict prior to reinstating the first representation, where resolving the conflict includes providing one or more user-selectable options to resolve the conflict and receiving input selecting one of the options.

23. A machine-readable storage device or a machine-readable storage substrate having stored thereon instructions which, when executed by a processor, cause the processor to perform operations comprising:
   evaluating a current view of a user interface;
   determining that an undesirable change to the current view of the user interface has occurred relative to a past view of the user interface;
   suspending the current view of the user interface;
   presenting one or more representations of past views of the user interface in a presentation window distinct from the user interface, where each representation shows a past state of the current view of the user interface and includes visual representations of elements from the past state, and where the underlying data for each representation is stored in an archive;

receiving input requesting that the current view be modified according to a first representation in the one or more representations;

determining if a conflict exists between the first representation and the current view; and reinstating the first representation into the current view, including, when a conflict exists between the first representation and the current view, resolving the conflict prior to reinstating the first representation, where resolving the conflict includes providing one or more user-selectable options to resolve the conflict and receiving input selecting one of the options.

24. The machine-readable storage device or machine-readable storage substrate of claim 21, wherein the criterion includes capturing a state of a view of the user interface when any element is added to or deleted from the user interface.

25. A computer-implemented method, comprising:

capturing a state of a past view of a user interface;

determining that a change to a current view of the user interface has occurred relative to the past view of the user interface;

presenting a representation of the past view of the user interface in a presentation window distinct from the user interface;

receiving input requesting that the current view be modified according to the representation;

determining that a conflict exists between the representation and the current view; and presenting a conflict resolution view to resolve the conflict in response to the determination, the conflict resolution view presenting one or more user-selectable options to resolve the conflict.

* * * * *

UNITED STATES PATENT AND TRADEMARK OFFICE
CERTIFICATE OF CORRECTION

| | | |
|---|---|---|
| PATENT NO. | : 7,853,567 B2 | Page 1 of 1 |
| APPLICATION NO. | : 11/499885 | |
| DATED | : December 14, 2010 | |
| INVENTOR(S) | : Pavel Cisler et al. | |

It is certified that error appears in the above-identified patent and that said Letters Patent is hereby corrected as shown below:

On page 3, in column 1, under "Other Publications", line 10, delete "Wellesly" and insert -- Wellesley --, therefor.

Signed and Sealed this
Eighth Day of November, 2011

David J. Kappos
*Director of the United States Patent and Trademark Office*